Jan. 22, 1957 R. G. FRIEDMAN 2,778,451
DISC BRAKE
Filed Aug. 14, 1953 3 Sheets-Sheet 1
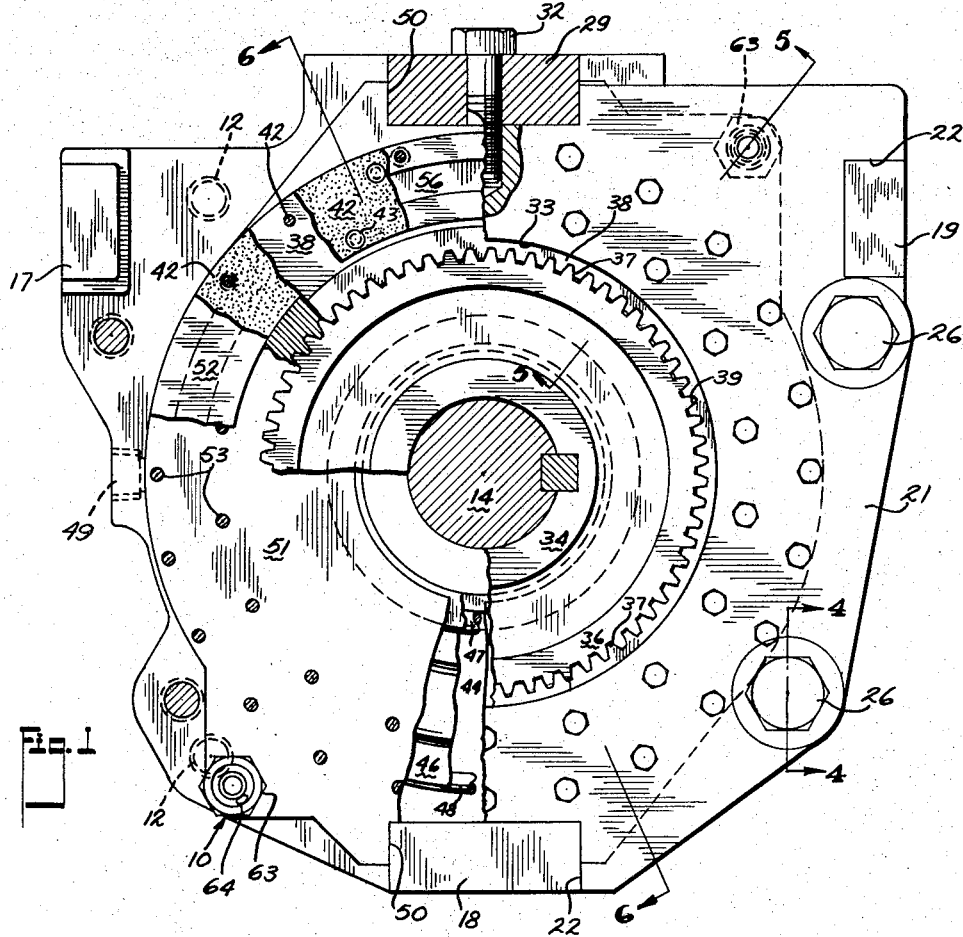
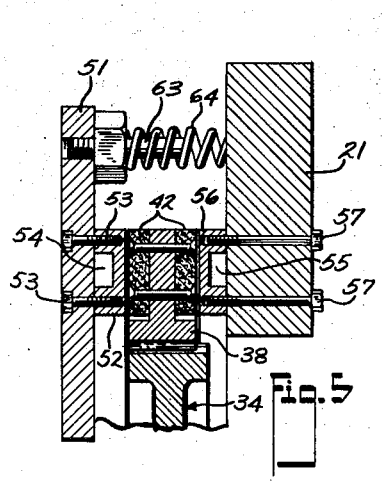
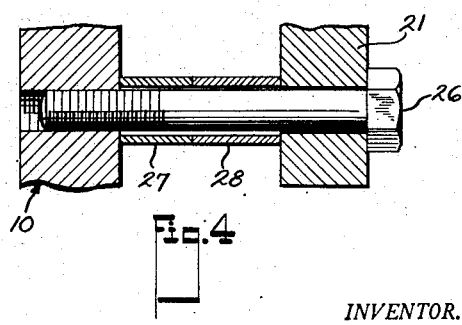
INVENTOR.
ROBERT G. FRIEDMAN
BY
RICHEY, WATTS, EDGERTON & McNENNY
ATTORNEYS Jan. 22, 1957  R. G. FRIEDMAN  2,778,451
DISC BRAKE
Filed Aug. 14, 1953  3 Sheets-Sheet 3
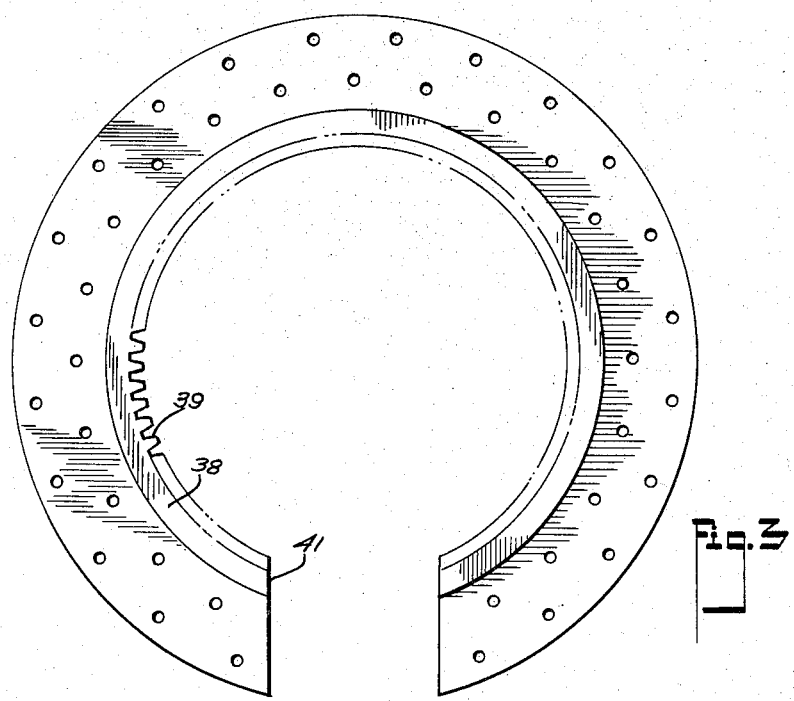
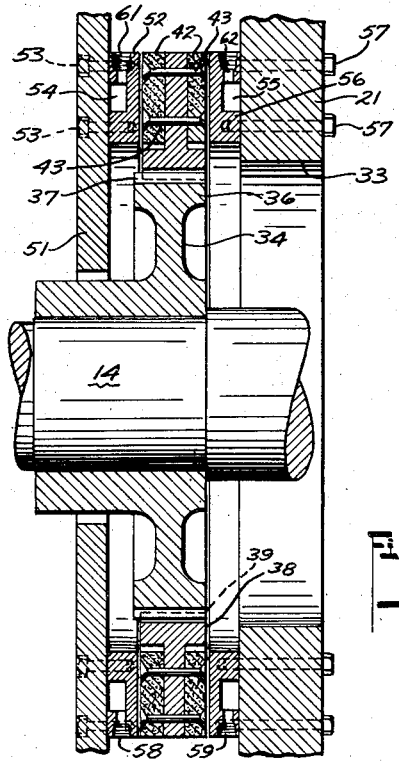
INVENTOR.
ROBERT G. FRIEDMAN
BY
RICHEY, WATTS, EDGERTON & McNENNY
ATTORNEYS United States Patent Office 2,778,451
Patented Jan. 22, 1957

2,778,451

DISC BRAKE

Robert G. Friedman, Tiffin, Ohio, assignor to The National Machinery Company, Tiffin, Ohio, a corporation of Ohio Application August 14, 1953, Serial No. 374,293

3 Claims. (Cl. 188—72)

This invention relates to brakes in general and more particularly to a brake mechanism for use on heavy machinery such as forging presses and the like.

This invention is particularly useful in forging machinery of the type wherein the machine operates through one complete cycle forging one piece and then comes to rest. While the machine is at rest the operator removes the forged articles and inserts another blank into the dies after which the machine is started and again operates through another cycle. It is highly important in such single cycle forging machines that the machine be brought to rest in the desired position so it is necessary to provide brakes having large capacities which will readily bring the machine to rest. Of course, those skilled in the art will realize that such machines have a great deal of inertia and that the brake will therefore have to absorb very large forces. In order to provide access to the brakes so that the friction members can be removed and relined without elaborate dismantling of the machine it has been necessary to mount the brakes outside of the machine frame. The outboard type mounting of this nature has created many difficulties causing whip and bending of the shafts because the shaft in such brakes is not supported on both sides of the brake.

It is an important object of this invention to provide a brake structure which may be mounted within the frame of a machine between bearings and which can be dismantelled easily to permit the replacement of worn brake lining.

It is another object of this invention to provide a brake structure which may be mounted between the bearings to reduce whip and chattering in the shaft and thereby provide longer life and less wear.

It is still another object of this invention to provide a brake structure which may be mounted within the frame of a machine thereby eliminating projections and providing a more compact machine.

It is still another object of this invention to provide a brake adapted for mounting within a machine frame between bearings which permits removal of the friction ring radially over the shaft on which the friction ring is normally mounted.

The foregoing and other objects and advantages will become apparent in view of the following description taken in conjunction with the drawings, wherein:

Fig. 1 is an end view of a brake embodying this invention with parts partially broken away to show the assembled structure;

Fig. 3 is an end view of the friction ring showing the radial opening;

Fig. 4 is a cross section along 4—4 of Fig. 1 showing the face plate spacers;

Fig. 5 is a section along 5—5 of Fig. 1 showing the structure of the springs used to release the brake; and Fig. 6 is a cross section along 6—6 of Fig. 1 showing the cooling fluid inlets and outlets.

Figure 2:
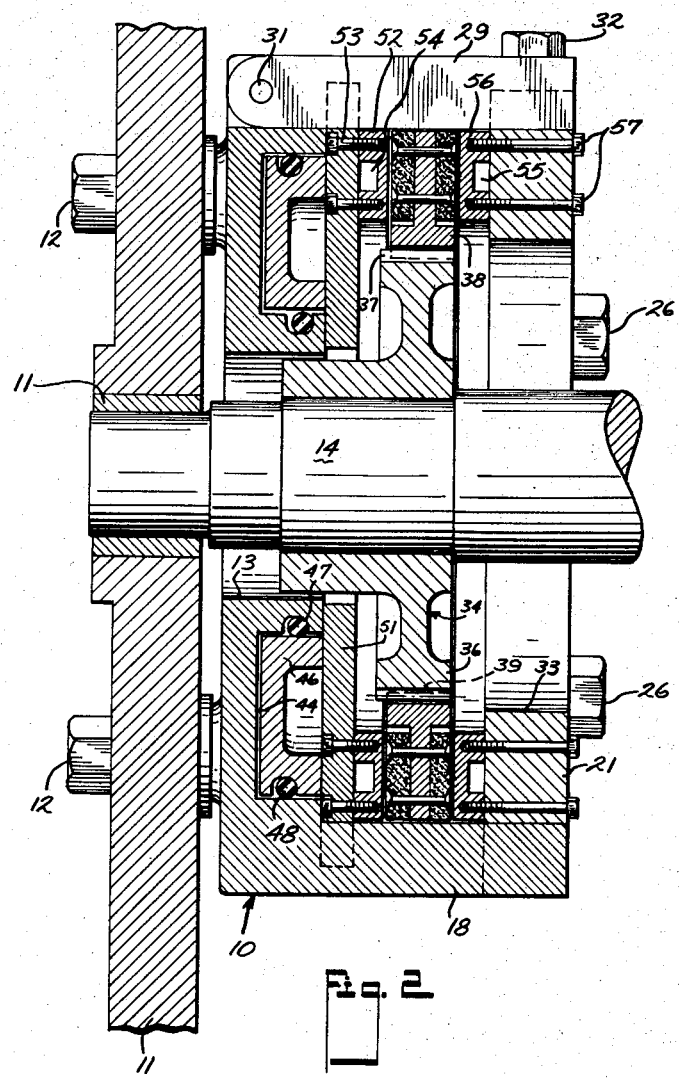
Fig. 2 is a vertical cross section of a brake according to this invention.

In a brake structure according to this invention a friction ring is provided which is formed in the shape of an open-ended ring. The open ends of the ring provide spaced substantially parallel walls which define a substantially radial opening. The width of this opening is at least as great as the diameter of the shaft on which the ring is mounted so that the ring may be positioned around the shaft by radially moving the ring relative to the shaft with the shaft passing through the opening. This structure eliminates the necessity of removing the ring from the end of the shaft and permits its removal anywhere along the shaft. It is apparent that such a structure has many advantages since it is then possible to mount the brake between bearings and to overhaul and recondition the brake without disassembling the bearings.

Referring to the drawings, the brake structure according to this invention includes a base plate 10 adapted to be mounted on a machine frame 11 by means of the bolts 12. The base plate is formed with a central aperture 13 which fits around the shaft 14. A bearing 16 is mounted in the frame 11 to secure the end of the shaft 14. Another bearing which is not shown for purposes of simplicity is provided at the other end of the shaft. The base plate 10 is formed with integral guides 17, 18 and 19 which extend at right angles to the base plate 10. A face member 21 is formed with notches 22 adapted to receive the guides 17, 18 and 19. Bolts 26 extend through the face member 21 and secure it to the base plate 10. Spacers 27 and 28 shown in Fig. 4 are positioned on the bolts 26 between the base plate 10 and the face member 21. The guides 17, 18 and 19, together with the bolts 27 and the spacers 27 and 28, securely position the face member 21 in a fixed spaced relationship with the base plate 10. However, by loosening the bolts it is possible to slide the face member 21 axially away from the base plate 10. A pivoted guide 29 is pivoted to the base plate 10 as at 31 and is provided with a bolt 32 which bolts the pivoted guide to the face member 21 when the brake is assembled. The face member 21 is also provided with an aperture 33 through which the shaft 14 extends.

The shaft 14 is provided with a hub 34 which is keyed thereto and formed with an annular flange 36. The periphery of the flange 36 is formed with a spline 37 on which the friction ring 38 is mounted.

The friction ring 38 is substantially annular in shape and is formed with an internal spline 39 having the same pitch diameter as the spline 37. The friction ring in the preferred embodiment is formed with a substantially radial opening 41 therethrough as shown in Fig. 3 which is at least as wide as the diameter of the shaft 14. This opening 41 permits the assembly of the friction ring over a midsection of the shaft 14 and permits the assembly and disassembly of the brake structure according to this invention without removing the friction ring over the end of the shaft. Nevertheless the ring remains substantially annular and substantially surrounds the spline 37 on the flange 36 since the diameter of the mid-section of the shaft 14 is less than the diameter of the flange 36. Thus the friction ring 38 is securely mounted upon the shaft by the engagement of its internal spline 39 with the spline 37 through more than 180°.

Both radial faces of the friction ring 38 are provided with brake lining material 42 which may be secured in place by means of the rivets 43.

The base plate 10 is formed with an annular cylinder cavity 44 in which the annular piston 46 is positioned. An inner seal 47 and outer seal 48 provide a fluid seal between the piston 46 and the cylinder 44. A fluid inlet 49 in fluid communication with the cylinder 44 is provided in the base plate 10 and serves as a passage which is connected to the source of fluid pressure which operates the brake.

A pressure plate 51 surrounds the shaft 14 and abuts against the piston 46. The pressure plate 51 is also formed with notches 50 which fit around the guides 17, 18, 19 and 29 which prevent any rotational movement of the pressure plate but permit axial travel. A first brake shoe 52 is bolted to the pressure plate 51 by means of the bolts 53. In the preferred embodiment an annular groove is formed in the rearward face of the first brake shoe 52 which, in cooperation with the pressure plate 51, forms a coolant passage 54 around the brake shoe through which cooling water or other liquid may be passed. The first brake shoe 52 is thereby mounted adjacent to one face of the friction ring 38 and is adapted to be moved axially by the piston 46 through the pressure plate 51 into engagement with the friction ring 38. A second brake shoe 56 is mounted on the face member 21 adjacent to the other side of the friction ring by means of bolts 57. This brake shoe, like the first brake shoe 52, is formed with an annular groove which, in cooperation with the face member 21, forms a cooling liquid passage 55 through which cooling water or other liquid is forced to complete the brake shoe cooling. Inlets 58 and 59 are provided in the bottoms of the brake shoes 52 and 56 respectfully through which the cooling liquid flows into the cooling liquid passages 54 and 55. Similar outlets 61 and 62 are provided in the upper portions of the brake shoes 52 and 56 to provide an outlet for the cooling liquid.

Two or more spaced spring studs 63 are provided on the pressure plate 51 and serve to locate springs 64 which extend between the pressure plate 51 and the face member 21. These springs serve to bias the pressure plate away from the face member tending to move these two members apart.

In operation the brake is normally released by the springs 64 excepting when fluid under pressure is supplied to the cylinder 44. When the fluid under pressure enters the cylinder 44 through the inlet 49 the piston 46 is urged to the right thereby moving the brake shoe 52 through the pressure plate 51 toward the friction ring 38. The friction ring 38 is easily axially slidable relative to the annular flange 36 so under the pressure of the brake shoe 52 it moves axially to the right (as shown in Fig. 1) into engagement with the brake shoe 56. When both of the brake shoes are in engagement with the friction ring 38 any further force created by the piston 46 increases the axial pressure therebetween. Of course, friction is set up between the friction ring 38 and the brake shoes 52 and 56 which opposes any relative movement therebetween thereby bringing the friction ring 38, the hub 34 and the shaft 14 to rest.

When the fluid under pressure is released from the cylinder 44 the springs 64 again move the pressure plate 51 and, in turn, the brake shoe 52 away from the brake shoe 56 thereby releasing the engagement between the friction ring 38 and the brake shoes.

When the brake linings 42 are worn and require replacement it is a simple matter to remove the bolt 32 and rotate the pivoted guide 29 out of the way. The bolts 26 are then removed permitting the axial movement of the face member to the right (as seen in Fig. 2) away from the friction ring 38. The friction ring 38 is then moved to the right until it clears the hub 34 at which time it may be removed from the brake structure vertically with the opening 41 passing over the shaft 14. At this time either a new or a relined friction ring is substituted and the brake is re-assembled and ready for use. Because it is possible to remove the friction ring over a midsection of the shaft it is not necessary to disassemble the bearings and other mounting members as has been required in the past. Those skilled in the art will realize that the advantages derived from this brake structure permit extreme savings in tear down time to reline the friction rings as well as providing a simple effective manner of accomplishing the repair. Since the shaft may be supported at both ends by bearings chattering and whipping are substantially reduced so longer life of the machine results.

Having completed a detailed description of a preferred embodiment of the present invention so that others skilled in the art will be able to understand and practice the same, I state that what I desire to secure by Letters Patent is not limited by said preferred embodiment but rather is defined in what is claimed.

What is claimed is:

1. A friction brake including a fixed member and a relatively rotatable central shaft, a pair of pressure plates surrounding said shaft secured against rotation with respect to said fixed member, one of said pressure plates being mounted for axial movement, a friction plate comprising an open-ended ring shaped body substantially surrounding said shaft and positioned between said pressure plates, a splined hub secured to said shaft having a greater diameter than said shaft, an internal spline on said friction plate fitting the spline of said hub and mounting said friction plate for axial sliding movement thereon, the open ends of said ring being spaced apart a distance greater than the diameter of said shaft and less than the diameter of said hub, whereby said ring may be slid axially out of said mounting means and removed radially from said shaft.

2. A friction brake comprising a base plate adapted to be secured in a fixed position, a face plate spaced from said base plate each of said plates having a central opening, a shaft extending through said central openings, a friction plate splined to said shaft and positioned between said base plate and said face plate, means securing said face plate to said base plate about the peripheries thereof and including circumferentially spaced guide means, a pressure plate disposed between said base plate and said face plate and having notches in its peripheral surface slidably fitting said guide means, at least one of said guide means being mounted for ready removal radially outward from the notch of said pressure plate to expose said friction plate.

3. A friction brake including a fixed member and a relatively rotatable central shaft, a pair of pressure plates surrounding said shaft secured against rotation with respect to said fixed member, axially extending guides radially outside said pressure plates, one of said pressure plates being slidably mounted on said guides, a friction plate comprising an open-ended ring shaped body substantially surrounding said shaft and positioned between said pressure plates, said friction plate being splined to said shaft, the open ends of said ring being spaced apart a distance greater than the diameter of said shaft, one of said guides being readily removable from radial alinement with said friction plate, whereby said one guide may be removed therefrom and said friction plate may be removed radially from said shaft.

References Cited in the file of this patent
UNITED STATES PATENTS

| | | |
|---|---|---|
| 2,082,633 | Johnstone | June 1, 1937 |
| 2,105,867 | Stewart | Jan. 18, 1938 |
| 2,108,059 | Glasner | Feb. 15, 1938 |
| 2,159,326 | Harwood et al. | May 23, 1939 |

FOREIGN PATENTS

| | | |
|---|---|---|
| 839,019 | France | Dec. 26, 1938 |